United States Patent [19]

VanErden

[11] Patent Number: 4,931,003

[45] Date of Patent: * Jun. 5, 1990

[54] APPARATUS FOR MAKING BIAXIALLY STRETCHED TUBULARLY EXTENDED FILM WITH TRANSVERSE CLOSURE STRIP

[75] Inventor: Donald L. VanErden, Wildwood, Ill.

[73] Assignee: Minigrip, Inc., Orangeburg, N.Y.

[*] Notice: The portion of the term of this patent subsequent to Feb. 28, 2006 has been disclaimed.

[21] Appl. No.: 363,548

[22] Filed: Jun. 8, 1989

Related U.S. Application Data

[62] Division of Ser. No. 139,970, Dec. 31, 1987, Pat. No. 4,842,907.

[51] Int. Cl.⁵ .............................................. B29C 55/26
[52] U.S. Cl. .................................... 425/66; 264/209.3; 425/72.1; 425/325
[58] Field of Search .................. 425/72.1, 66, 71, 325, 425/327, 302.1, 393; 264/151, 209.2, 209.3; 428/112, 35.5, 222, 910, 474.4; 156/66, 244.15

[56] References Cited

U.S. PATENT DOCUMENTS

| Re. 29,208 | 5/1977 | Naito | 156/91 |
| 3,888,609 | 6/1975 | Saint Eve et al. | 425/72.1 |
| 4,022,558 | 5/1977 | Herrington | 425/72.1 |
| 4,069,292 | 1/1978 | Herrington et al. | 425/72.1 X |
| 4,189,288 | 2/1980 | Halter | 425/72.1 |
| 4,246,212 | 1/1981 | Upmeier et al. | 425/72.1 X |
| 4,479,766 | 10/1984 | Planeta | 425/72.1 |
| 4,528,235 | 7/1985 | Sacks et al. | 428/474.4 X |
| 4,701,361 | 10/1987 | Van Erden | 428/112 X |
| 4,808,099 | 2/1989 | Van Erden | 425/72.1 |

Primary Examiner—Richard L. Chiesa
Attorney, Agent, or Firm—Hill, Van Santen, Steadman & Simpson

[57] ABSTRACT

Apparatus for extending film tube from high density polyethylene biaxially oriented in longitudinal or machine direction as well as in cross machine diameter-increasing direction, and for joining extruded closure strip carried helically on one wall of the tube correspondingly stretched as a result of the biaxial stretching to which the film of the tube is stretched. The closure-strip-carrying, biaxially oriented tube is adapted to be converted into a ribbon sheet form with the closure strip extending as individual closure strip sections across the ribbon sheet form at longitudinally spaced intervals, and adapted for making bags.

5 Claims, 1 Drawing Sheet

APPARATUS FOR MAKING BIAXIALLY STRETCHED TUBULARLY EXTENDED FILM WITH TRANSVERSE CLOSURE STRIP

This is a division of application Ser. No. 139,970, filed Dec. 31, 1987, now U.S. Pat. No. 4,842,907.

BACKGROUND OF THE INVENTION

This invention relate s generally to the making of extruded plastic bag making material equipped with separable fastener means, and is more particularly concerned with improvements over the disclosure in my recently issued U.S. Pat. No. 4,701,361 dated Oct. 20, 1987.

In my aforesaid patent, is disclosed a method of and an apparatus for producing plastic film with transverse closure strips and especially adapted for making bags. A plastic film tube is continuously extruded along a given longitudinal axis, and there is joined with a surface of the tube closure strip means having a longitudinal strip axis which extends across the tube axis in generally helical fashion. The tubular film is converted into ribbon sheet form with the closure strip means extending as individual closure strips across the ribbon sheet form at longitudinally spaced intervals. In the extrusion of the plastic film tube, according to that disclosure the tube diameter is maintained substantially the same as the extrusion orifice of the extruder. Such arrangement permits only a longitudinal axial orientation in the film.

However, for improvement in the water vapor transmission rate of high density polyethylene a biaxial orientation in the film structure is desirable. A general arrangement for attaining the biaxial orientation in the film tube is disclosed in U.S. Pat. Re. 29,208, but therein coextruded fastener strip means extends strictly longitudinally parallel to the axis of the tube through all phases of its manufacture and conversion into bag material.

SUMMARY OF THE INVENTION

An important object of the present invention is to provide new and improved plastic bag making film material or the kind wherein at least one profile strip extends helically on an extruded tubular plastic film.

Another object of the invention is to provide a tubularly extruded high density polyethylene film carrying a helically extruded fastener means and wherein the film is biaxially oriented and the fastener means correspondingly stretched.

This invention provides an apparatus for producing plastic film with transverse closure strips and especially adapted for making bag, comprising means for continuously extruding and running a plastic film tube along a given longitudinal axis, means for joining with a surface of the tube a closure strip means extending helically relative to the tube axis, means for subjecting the tubular extrusion and the joined closure strip means to axial machine direction draw and also to cross machine diameter-increasing draw for effecting stretching of the tubular film and for increasing the diameter of the tube, and for corresponding stretching of the closure strip means, and means for controlling both of the draws for maintaining a predetermined helix angle of the closure strip means in the increased diameter tube.

BRIEF DESCRIPTION OF THE DRAWINGS

Other objects, features and advantages of the present invention will be readily apparent from the following description of representative embodiments thereof, taken in conjunction with the accompanying drawing although variations and modification may be effected without departing from the spirit and scope of the novel concepts embodied in the disclosure, and in which.

DETAILED DESCRIPTION

Figure 1:
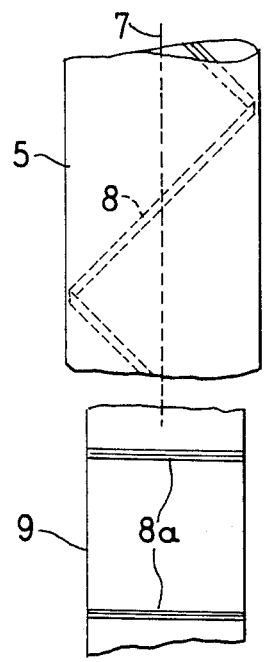
FIG. 1 is a schematic illustration of tubular plastic film especially adapted for making bags with transverse closure strips, and also showing the material as converted from the tubular form into ribbon sheet form.
Figure 2:
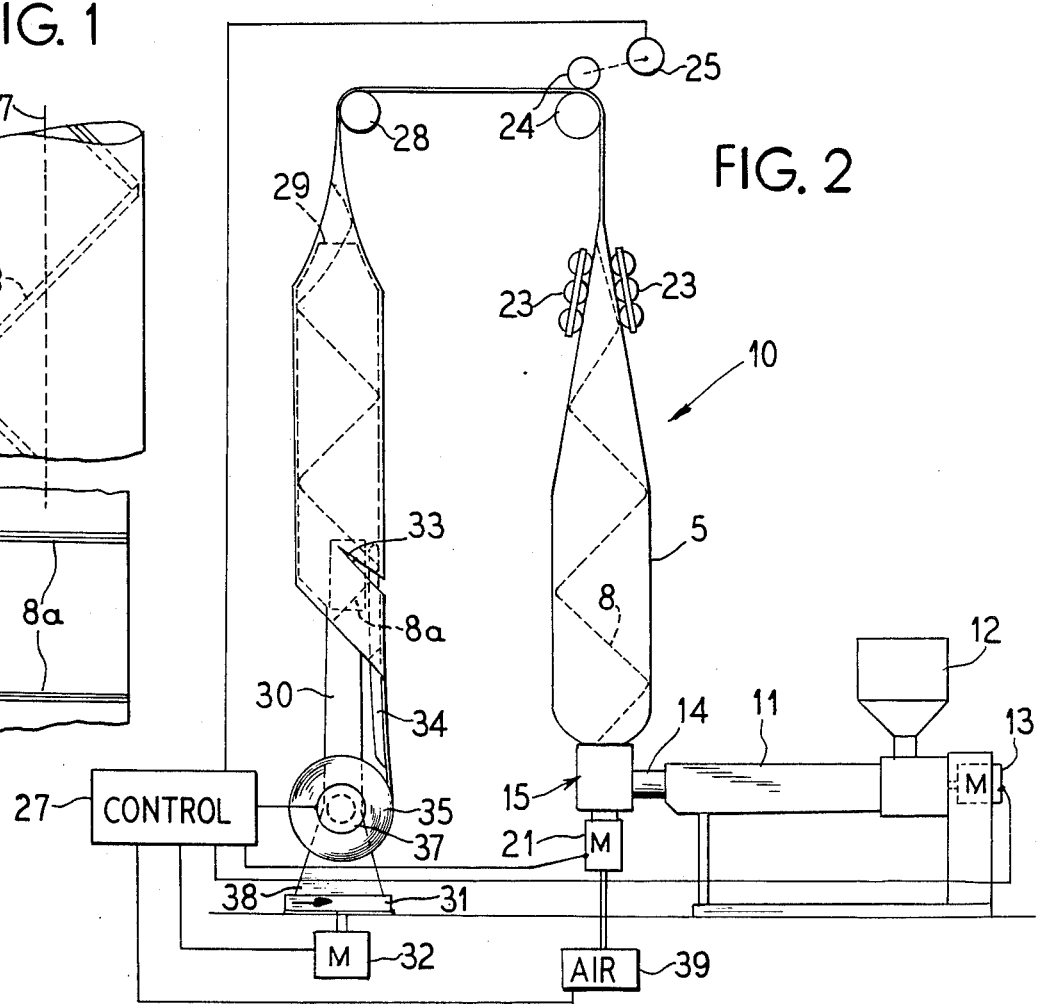
FIG. 2 is a schematic illustration of apparatus for practicing a method of producing the closure strip equipped plastic film and converting the same into ribbon sheet form, according to the present invention.

As shown in FIGS. 1 and 2, a continuously extruded plastic film tube 5, having a longitudinal axis 7, has closure strip means 8 joined helically to a surface of the tube, herein to the inner side of the tube, so that the closure strip means extends generally transverse relative to the tube axis. The plastic film tube 5 is converted int ribbon sheet form 9, with the closure strip means 8 extending as individual closure strips 8a across the sheet form 9 at longitudinally spaced intervals corresponding generally to the lengths of bags into which the fastener strip material is adapted to be formed.

In apparatus 10 (FIG. 2), for practicing the method of the present invention, any preferred known extruder 11, which may have a supply hopper 12 and a drive motor 13, extrudes molten, thermoplastic, plastic material through a nozzle 14 into an extrusion die structure 15. By preference, the plastic material is high density polyethylene.

Figure 4:
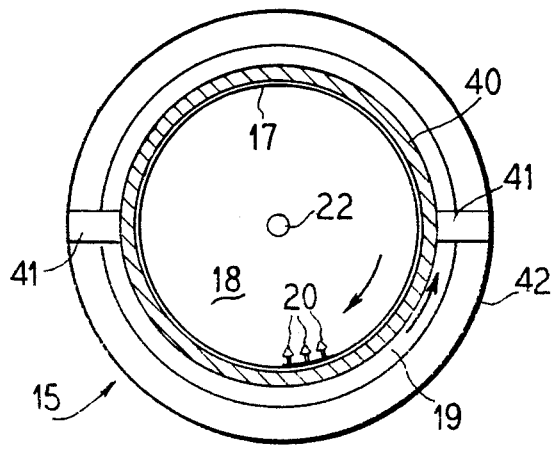
FIG. 4 is an enlarged fragmentary detail view taken substantially along the line IV—IV in FIG. 3.

The molten plastic is extruded upwardly through an orifice 17 (exemplified in FIG. 4), which has means for not only forming the tubular film 5 but also the closure strip means 8. For this purpose, the die structure comprises an inner circular member die 18 and an outer circular die member 19, between which the orifice 17 is defined. In addition, the inner die member 1B has orifice configuration for continuously extruding the closure strip means 8 which, as shown, is of the multi-profile form having three interlockable profiles 20. There may, of course, be less or more of the profiles, as desired.

Desirably, the arrangement and operation of the die structure 15 is such that at least the inner die member 1B is rotatably operated for joining the closure strip means 8 with the surface of the tube 5 in uniformly helical fashion. Means such as a motor 21 may be provided for driving the die member 18 rotatably in properly coordinated relation with operation of the extruder 11 to effect the uniform spiral form of the closure strip means as the film tube 5 is continuously extruded. Although the outer die member 19 may be stationary, it is desirably also rotatably driven but in the opposite rotary direction from the inner die member 18, as is indicated by directional arrows. Air is injected through a port 22 desirably centrally located through the die member 18 for controlling the tubular shape of the tube 5 and for cooling the tube 5 and the closure strip 8. When the unitary plastic assembly of extruded tubular film 5 carrying the coextruded fastener strip 8 is thoroughly self sustaining, collapsing rollers 23 flatten the tube 5 which then passes through driving pinch rolls 24 that art driven by a motor 25 coordinated in operation with the motors 13 and 21 through a master control 27. From the rolls 24, the flattened plastic assembly passes over guide means such as idler roller 28 and travels downwardly over a spreader mandrel 29, which is mounted for rotation about its axis on supporting bracket or frame means 30 mounted on a rotary stand or turntable 31 driven rotatably as by means of a motor 32 coordinated in operation with the other driving means of the system. A rotary knife 33 at the lower end of the mandrel 29 cuts the onwardly travelling tubular film 5 continuously on the bias to convert the same into the ribbon sheet form 9. The knife 33 is so oriented relative to the onwardly travelling tubular film 5 that it will cut at right angles across the closure strip 8 while cutting the film tube 5 into the width of the film ribbon sheet 9 desired for making bags of predetermined width from the ribbon sheet. Although the ribbon sheet 9 may be directed immediately to a bag forming operation, or even a bag forming and filling apparatus, the ribbon sheet 9 may be, as shown, directed by guide means 34 onto a reel 35 driven for wind-up by motor 37 mounted as by means of a bracket 38 on the turntable 31 for synchronized rotation with the knife 31 as controlled by the master control 27.

In order to attain improved water vapor transmission rate for the high density polyethylene film 5,9 the film in the extruded tubular form is biaxially oriented. For this purpose, the tubular film 5 is not only drawn axially in the machine direction by means of the drawing force of the rolls 24, but is also subjected to a diameter-increasing draw by means of air pressure delivered from an air source 39 injecting the air through the port 22. The machine direction or linear draw and the blow up or cross machine diameter-increasing draw may be in a substantial equal ratio so that the force vectors on the film will be in balance, with the die member 18 rotating to create a 45° helix of the fastener strip 8. Both the linear draw by the rolls 24 and the cross machine diameter-increasing draw effected by injection of air from the source 38 are controlled in the system by the master controller 27 to attain the desired helix angle for the fastener (zipper) strip 8. It will be appreciated, that not only is the tubular film 5 advantageously biaxially stretched, but the extruded fastener strip 8 carried thereby is also advantageously correspondingly stretched.

Better control of the stretching process may be provided for by means of a machine direction or axial draw extension tube or collar 40 (FIG. 3) through which the freshly extruded tubular film 5 travels a limited distance from the orifice 17, so that the machine direction draw is largely concentrated immediately after the extruded tube leaves the extrusion orifice 17. The collar 40 may conveniently be supported by means of brackets 41 on a stationary outer housing 42 of the extrusion die structure 15.

Figure 3:
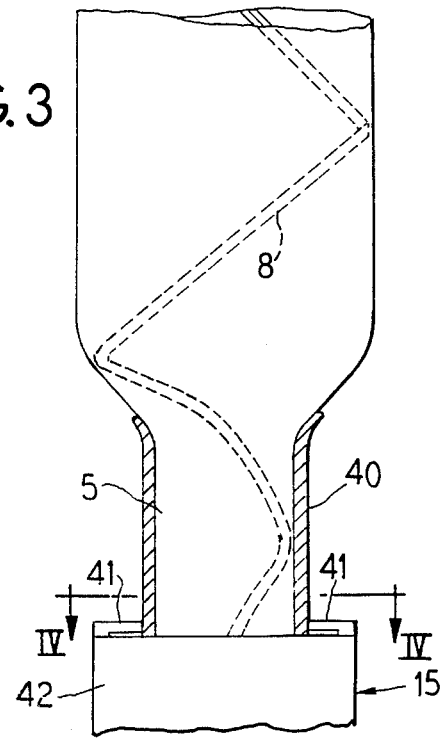
FIG. 3 is an enlarged fragmentary side elevational view, partially i n section, showing an arrangement for improving the machine direction draw and thus axial orientation of the plastic film.

At the exit from the machine direction draw collar 40, the cross machine diameter-increasing draw blow-up is effected, substantially as shown. For example, the cross machine diameter-increasing blow-up may be to a diameter on the order of three times t he diameter of the tube 5 as it is confined in travel through the collar 40. This arrangement not only improves the control for both of the axial or machine direction draw and the cross machine diameter-increasing draw, but also facilitates attainment of a predetermined helix angle for the closure strip 8 carried by the tubular film 5. As shown in FIG. 3, where the closure strip helix angle is about 30° as the closure strip is being stretched with the tubular film in travelling through the control collar 40, an about 50° angle may be achieved in the diameter-increasing draw, although by varying the diameter of the diameter-increasing draw, variations in the helix angle may be attained.

Proper control of all phases of the operation, including the axial draw or stretching of the film tube as well as the cross machine diameter-increasing draw and stretching of the film tube 5 are controlled i n coordinated relation with all of the other driving means in the system by means of the master control 27.

It will be understood that variations and modifications may be effected without departing from the spirit and scope of the novel concepts of the present invention.

I claim as my invention:

1. Apparatus for producing plastic film with transverse closure strips and especially adapted for making bags, comprising:
   means for continuously extruding and running a plastic film tube along a given longitudinal axis;
   means for joining with a surface of said tube a closure strip means extending helically relative to said tube axis;
   means for subjecting the tubular extrusion and the joined closure strip means to axial machine direction draw and also to cross machine diameter-increasing draw, for effecting stretching of the tubular film and for increasing the diameter of the tube, and for corresponding stretching of said closure strip means; and
   means for controlling both of said draws for attaining a predetermined helix angle of said closure strip means in the increased diameter tube.

2. Apparatus according to claim 1, wherein said means for joining coextrudes said closure strip means on the inside surface of said tube.

3. Apparatus according to claim 1, wherein said machine direction draw means includes a control tube collar which receives said plastic film tube to travel therethrough directly from an extrusion orifice, and said cross machine diameter-increasing draw is effected immediately after the film tube leaves said collar.

4. Apparatus according to claim 3, wherein said controlling means controls said helix angle of said closure strip means to be substantially less while the tubular film is travelling through said collar than the helix angle after said cross machine diameter-increasing draw.

5. Apparatus according to claim 4, wherein said controlling means controls said helix angle to be about 30° while the tubular film is travelling through said collar, and said helix angle to be about 50° after said cross machine diameter-increasing draw.

* * * * *